Oct. 21, 1969     T. M. MARQUIS ET AL     3,473,720

CARTON STAPLING MACHINE

Filed Aug. 4, 1967     10 Sheets-Sheet 1

THEODORE M. MARQUIS
JOHN A. CRABB
         INVENTORS.

BY

ATTORNEY.

FIG_8_

FIG_10

FIG_9

INVENTORS.
T. M. MARQUIS
J. A. CRABB

BY.

ATTORNEY.

INVENTORS.
T. M. MARQUIS
J. A. CRABB

BY

ATTORNEY

United States Patent Office 3,473,720
Patented Oct. 21, 1969

3,473,720
CARTON STAPLING MACHINE
Theodore M. Marquis, P.O. Box 1433, Yakima, Wash. 98901, and John A. Crabb, Yakima, Wash.; said Crabb assignor to said Marquis
Filed Aug. 4, 1967, Ser. No. 658,557
Int. Cl. B25c 7/00; B27f 7/22
U.S. Cl. 227—100                                    10 Claims

ABSTRACT OF THE DISCLOSURE

This machine receives a loaded carton having its top and bottom flaps folded against the contents and completes the packaging of the latter by simultaneously stapling together the flaps of the bottom of the carton and stapling together the flaps of the top of the carton.

BACKGROUND OF THE INVENTION

Field of the invention

This field embraces the development of equipment primarily for use in completing the packaging of products in fiberboard cartons by stapling together the flaps of the latter after the carton has been filled with a product and by performing this operation simultaneously on the top and bottom of the carton.

Description of the prior art

The closest prior art patent is No. 3,126,685 issued Mar. 31, 1964 to S. K. Paxton et al., on a machine which performs substantially the same task for which the present invention is provided but does this in a substantially different way. The patented machine employs stapling heads which are fed by strips of staples (very limited in capacity) whereas the present invention employs stapling heads which are supplied from coils of staples, giving a much greater operating capacity. The patented machine also drives staples into the top flaps of the carton by application of a substantial downward pressure against the upper stapling heads which pressure is transmitted to the carton and through the carton to the contents thereof. Stapling heads employed in the present invention are actuated by air pressure in a manner to obviate this down pressure on the product. The patented machine shifts the carton transversely in the machine into symmetrical transverse relation with the machine to accommodate the carton to the stapling mechanism thereof. In the present invention the carton retains its random location transversely relative to the machine and the stapling means is divided into right and left stapling mechanisms which independently accommodate themselves to the random transverse location of the carton so as to be properly related with the latter during the actuation of the stapling heads.

SUMMARY OF THE INVENTION

The principal object of the present invention is to replace the relatively complex and costly machine disclosed in the aforesaid prior Paxton patent by a relatively simple and inexpensive stapling machine. Another object is to provide such a machine as will accomplish the closure of the carton with a minimum of downward pressure thereagainst thereby protecting the product confined in the carton from damage by the stapling operation. This is accomplished by lowering the overhead stapling heads to rest lightly on the carton during the actuation of the stapling heads and effecting the latter by the use of air power which adds no downward pressure to the weight of the stapling heads while these are functioning.

In traveling through a carton stapling machine, a carton is supported on rollers rotating about transverse axes. It is necessary of course that the stapling heads and the carton be brought into the proper transverse relation as well as their being brought into the proper longitudinal relation prior to the actuation of the stapling heads to drive staples therefrom into the carton. In the patented machine above referred to, this dual symmetrical relationship between the carton and the stapling mechanism was accomplished by putting the burden on the stapling mechanism itself of shifting the carton transversely into symmetrical relationship with the stapling mechanism. This placed considerable work burden on the stapling mechanisms and has been eliminated in the present invention by the carton being allowed to retain its random location with reference to its transverse relationship with the stapling mechanisms and the latter are divided into right and left mechanisms which are independently shiftable relative to the carton so as to accommodate themselves to the latter to attain the required locations for driving staples into the carton.

This also facilitates the secondary indexing of the right and left stapling mechanisms for driving the second pairs of staples into the top and into the bottom of the carton in each stapling cycle.

The only centralizing of the carton which takes place in the present invention is that which places it in transverse alignment with the transverse vertical axial plane of the stapling mechanisms in which all staples are driven from the latter. This alignment is quickly effected by a pair of rollers lifted by airpower from the conveyor of the machine at the initiation of each stapling cycle.

BRIEF DESCRIPTION OF THE DRAWING

FIGURE 7 is a vertical sectional view taken on the line 7—7 of FIGURE 4 and constitutes a view of the internal mechanism of the invention taken from the left end thereof just inside the housing of the machine.

DESCRIPTION OF THE PREFERRED EMBODIMENT

The preferred embodiment of the invention illustrated in the drawings comprises a carton stapling machine 25, the frame structure of which includes a base plate 26 (FIGURES 4 and 5) supported on four corner anchor plates 27 and having rigidly mounted thereon symmetrical with a transverse medial vertical plane, end channel standards 28 and 29 and a somewhat shorter standard 30 located slightly left of the middle of the machine.

Figure 4:
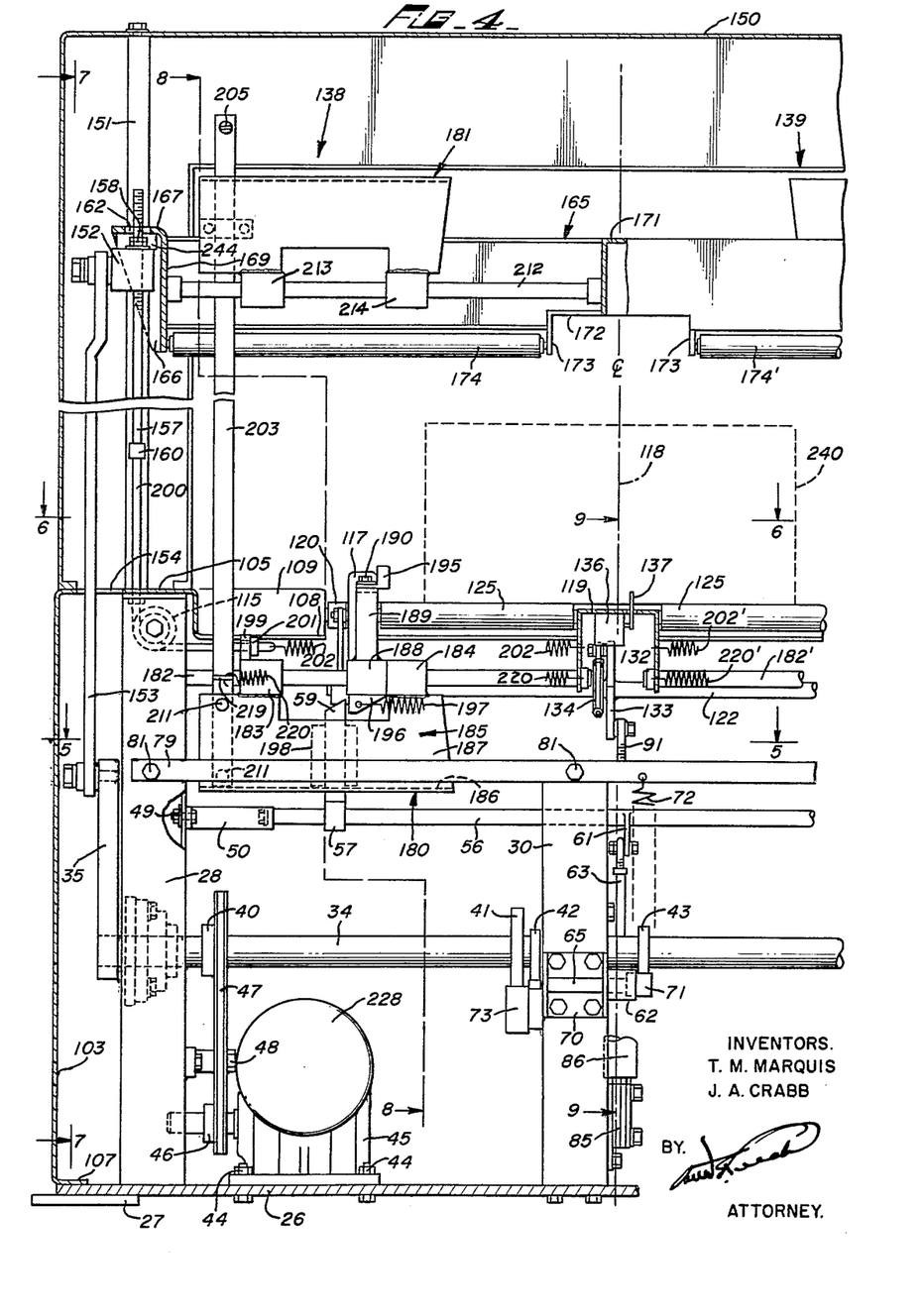
FIGURE 4 is a partial vertical transverse sectional view of said machine and shows the various elements of the left hand stapling mechanism thereof as positioned at the close of a stapling cycle.
Figure 5:
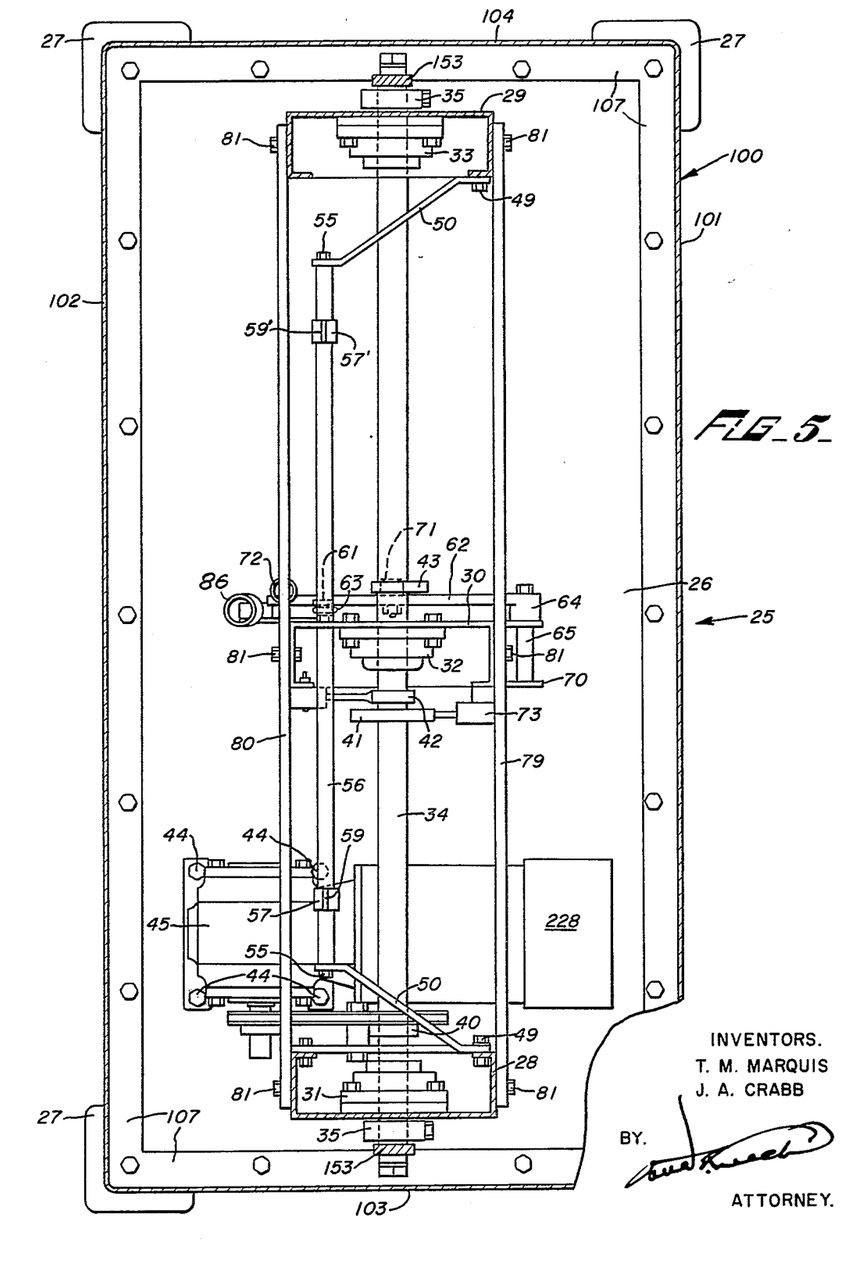
FIGURE 5 is a horizontal sectional view taken on the line 5—5 of FIGURE 4 and illustrates the cam shaft and power drive unit of the invention.

Fixed on the standards 28, 29 and 30 are main bearings 31, 32 and 33, in which is journaled a cam shaft 34. Fixed on opposite extending ends of shaft 34 are crank arms 35. Also fixed on said shaft are drive sprocket 40, stapling firing head switch cam 41, cycle closing cam 42 and stapling head relocation trigger cam 43.

Mounted on the base plate 26 by bolts 44 is a geared-down electric motor 45 having a drive pinion 46 which is aligned with and connected to drive sprocket 40 by an endless chain 47, the latter being kept properly tensioned by an idler sprocket 48.

pivotally mounted by bolts 49 on standards 28 and 29 are a pair of arms 50, free ends of which are secured by screws 55 to opposite ends of a shaft 56 which is thus swingably mounted about the axis of bolts 49. Slidable upon shaft 56 ase collars 57 and 57' on which are mounted stapling head indexing latches 59 and 59' respectively. Welded to the shaft 56 near its middle and extending downward therefrom is a lug 61. Pivotally connected to said lug at its upper end and at its lower end with a cam responsive arm 62, is an adjustable link 63. The arm 62 has a hub 64 which is pivotally mounted on an extending end of a shaft 65 which is securely fixed on standard 30 by a bracket 70. Rotatably carried on arm 62 is a cam responsive roller 71 which is aligned with cam 43 and held in contact therewith by a contractile spring 72.

Also fixed on short frame standard 30 opposite cam 41 is a switch 73 which controls the firing of the stapling heads, this switch having an actuating arm 74 which carries a roller 75 which is biased by a spring said switch to constantly contact the periphery of firing switch cam 41. On the opposite side of cam shaft 34, short standard 30 has mounted thereon a cycle-closing switch 76, having a spring biased arm 77 carrying a roller 78 which is constantly pressed by said arm into rolling contact with the periphery of cycle-closing cam 42.

Connecting the upper end of frame standard 30 with the end channel standards 28 and 29 are horizontal frame bars 79 and 80 which are secured to said standards by bolts 81.

Fixed on standard 30 and extending rearwardly therefrom near its lower end is an air cylinder mount 85 to which the lower end of an air cylinder 86 is pivotally connected by a pin 87. The cylinder 86 has a piston 88 and piston rod 89 which passes through an upper cylinder head 90 to connect with an extensible rod section 91. Air is supplied to the lower end of cylinder 86 through a hose 92 leading from an electric solenoid control valve 93.

The machine 25 includes a box-like housing 100 embracing front and back walls 101 and 102, end walls 103 and 104, and end decks 105. The vertical walls have flanges 107 which turn inwardly therefrom and are bolted to base plate 26. Housing end decks 105 rest on and are secured respectively to the upper ends of end standards 28 and 29. The inner edges of these decks bend downwardly to form supporting platforms 108 for deck boxes 109 which rest thereon and are secured thereto. Secured horizontally in upper portions of end standards 28 and 29 are short shafts 110 on which are mounted a pair of idle sprockets 115.

Figure 6:
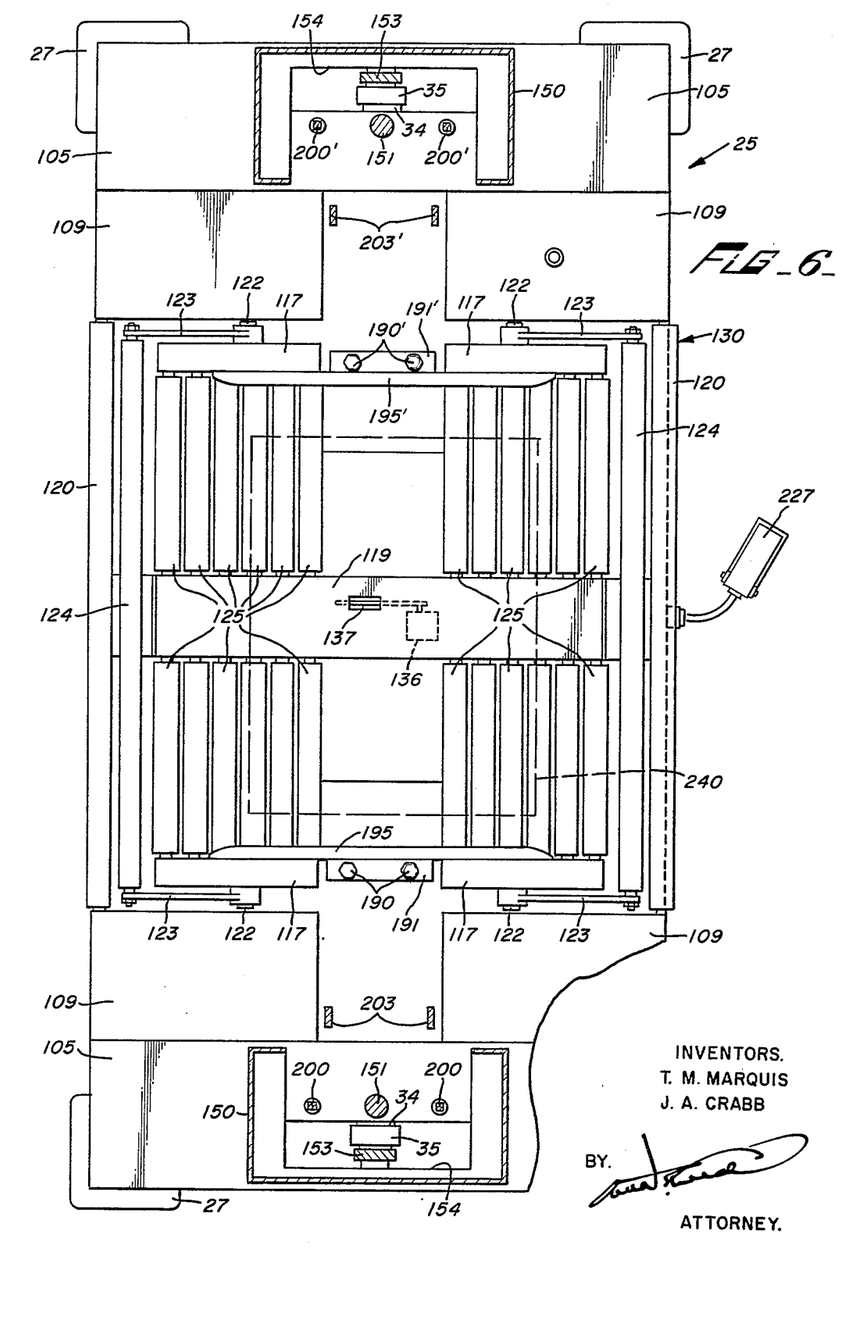
FIGURE 6 is a horizontal sectional view taken on the line 6—6 of FIGURE 4 and illustrates the carton conveyor and carton aligning mechanism of the invention.

Vertical frame plates 116 (FIGURE 8) are rigidly mounted on longitudinal bars 79 and 80 and front and rear housing walls 101 and 102 to provide support for frame islands 117 which are spaced inwardly, as clearly shown in FIGURE 6, from deck boxes 109. Outer end portions of islands 117 are curved downwardly for a reason which will be made clear hereinafter. Extending longitudinally through said machine in symmetrical relation with the center line 118 thereof is an inverted channel beam 119 opposite end portions of which are depressed, as shown in FIGURE 6, and are securely fastened to front and back housing walls 101 and 102. Outer exposed corners of deck boxes 109 rotatably support opposite ends of idle conveyor rollers 120. Journaled in bearings 121 mounted in frame plates 116 are shafts 122 on opposite ends of which are fixed arms 123, the extremities of which operate in pairs to rotatably support opposite ends of rollers 124, which lie just inwardly of rollers 120, and which cooperate with twenty-four shorter rollers 125, opposite ends of which are rotatably supported by the frame islands 117 and channel beam 119, as shown in FIGURE 6, so as to form a carton conveyor 130. This conveyor is for receiving cartons into the machine 25, supporting the same while a stapling operation is being performed thereon and discharging said cartons from said machine following the conclusion of the stapling cycle.

Figure 9:
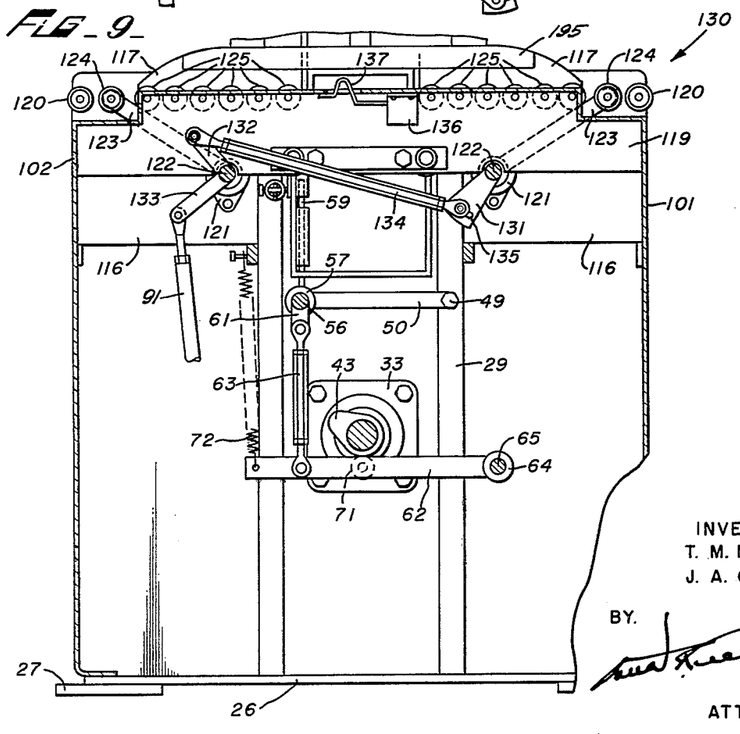
FIGURE 9 is a vertical section view taken on the line 9—9 of FIGURE 4 (which coincides with the center line of the machine).

In the are enclosed by the channel beam 119, the shafts 122 are provided respectively with arms 131 and 132 and the arm 132 has an arm 133 in bell crank relation therewith, the extremity of arrm 133 being pivotally connected to the upper end of the extensible piston rod section 91 of the air cylinder 86. The extremities of arms 131 and 132 are connected by an adjustable link 134 (FIGURE 9) and the arm 131 is provided with a slot 135 through which adjustment may be made in the point on arm 131 at which said link 134 connects to said arm.

Mounted inside the channel beam 119 is a safety switch 136 having an actuating finger 137 which extends upwardly through a hole in said beam and above the level of the carton supporting surfaces of the conveyor 130.

Figures 1, 2, 3:
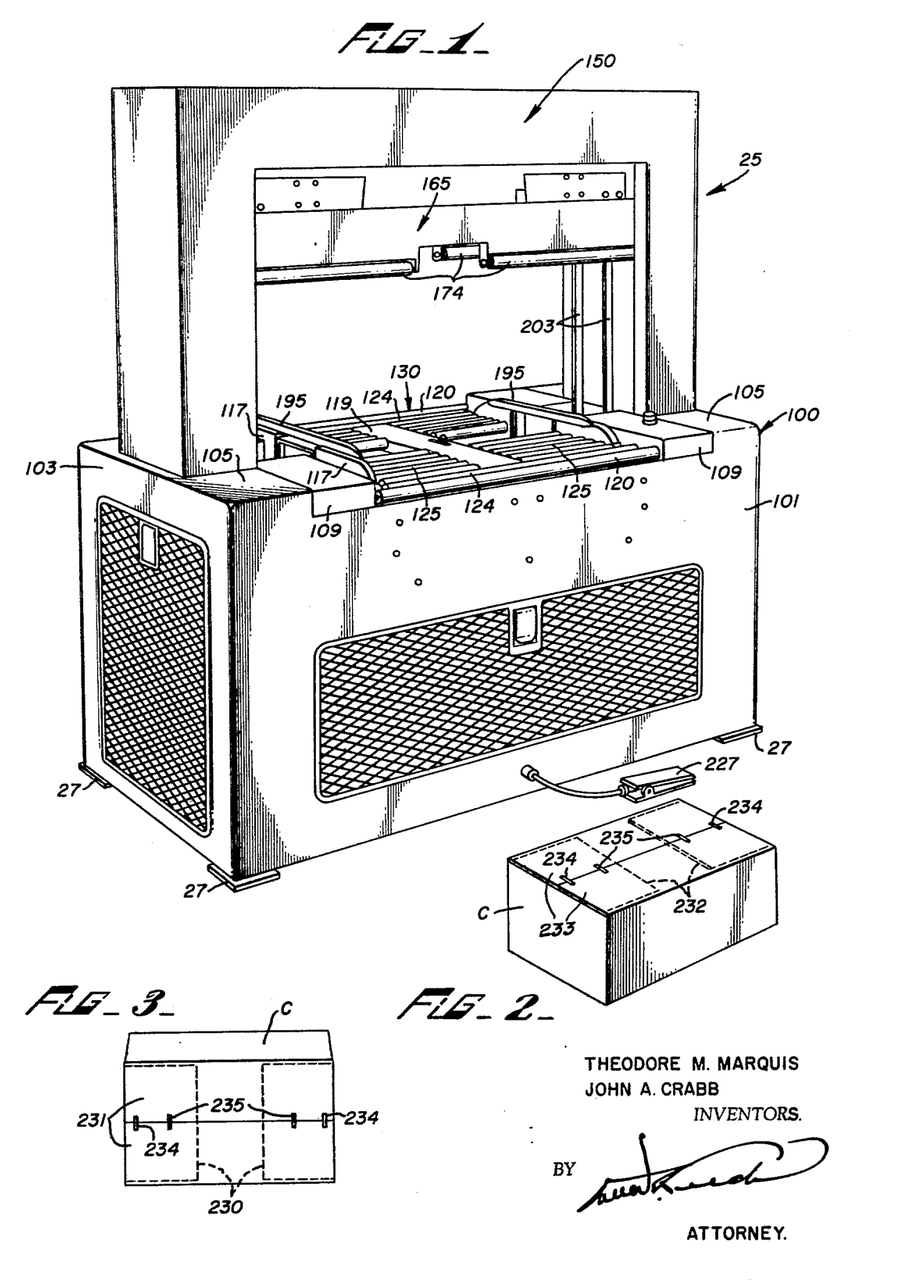
FIGURE 1 is a perspective view of a preferred embodiment of the invention.
FIGURE 2 is a perspective three-quarter view of a carton, seen from above, the closing of which has just been completed by subjecting the same to a stapling cycle of said machine.
FIGURE 3 is a three-quarter perspective view of said carton viewed from below to show the staples driven into the bottom of the carton in said stapling cycle.
Figure 1:
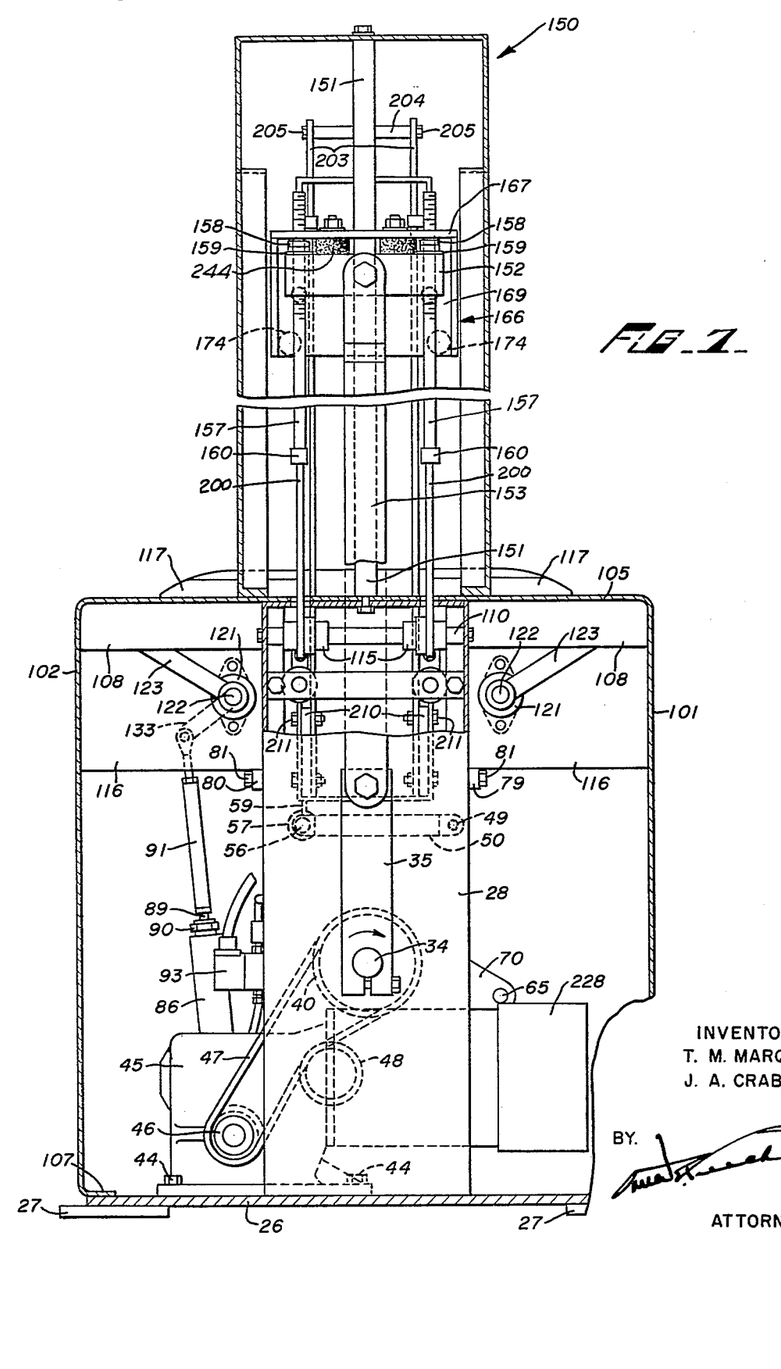
Figure 11:
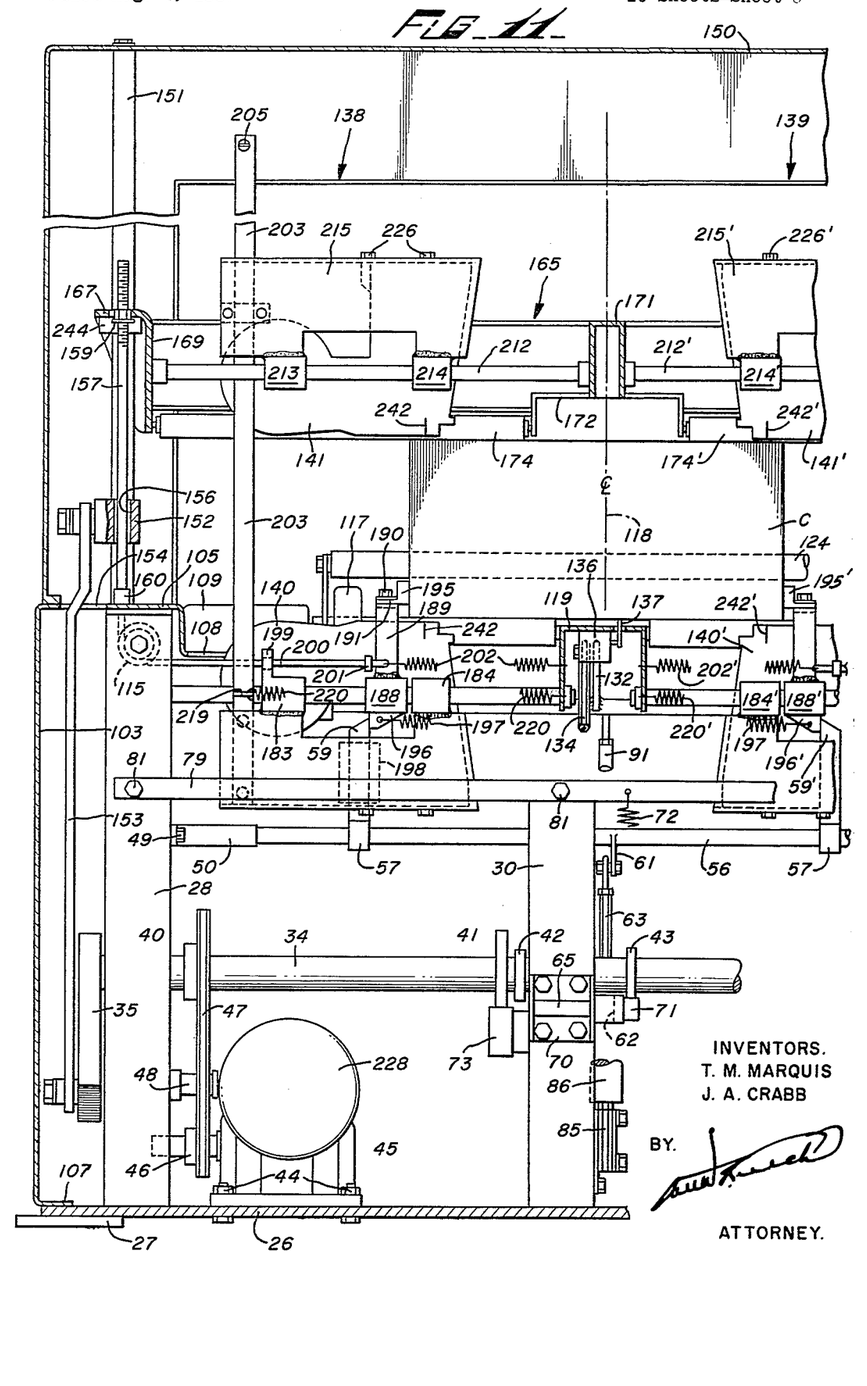
FIGURE 11 is a view similar to FIGURE 4 with the outlines of the stapling heads of the stapling mechanisms added and with the various parts of the machine positioned at the point in a stapling cycle where the cam shaft has just completed a rotational movement of 135° from the start of said cycle. The point thus illustrated is that at which the stapling heads are actuated to drive the first pairs of staples driven during the cycle in the top and bottom of the carton.
Figure 12:
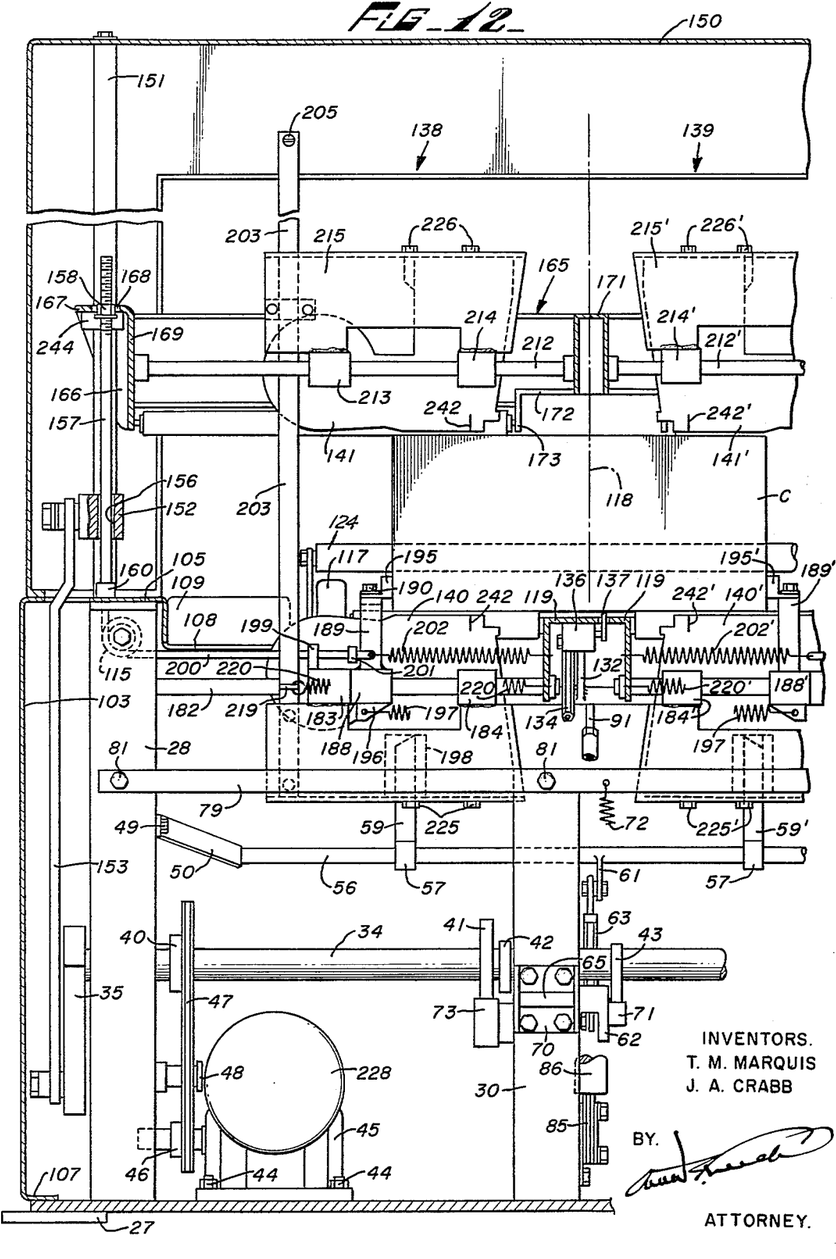
FIGURE 12 is a view similar to FIGURE 11 and illustrates the parts of the machine as located at the point at which the cam shaft has just completed rotating 225° of its single revolution during a stapling cycle and thus is the point where the various stapling heads of the machine have been shifted into their inwardly indexed positions for driving the second pairs of staples into the top and bottom of said carton which staples are spaced inwardly predetermined distances, as shown, from the locations of the first pairs of staples so driven, as illustrated in FIGURE 11.

While cartons may be rolled onto and from the carton conveyor 130 of the machine 25 in either direction, the front of the machine, for the purposes of this description, will be considered to be the portion occupied by housing front wall 101 and presented to view in the perspective view of FIGURE 1. From this viewpoint, it is evident that FIGURES 4, 11 and 12 are partial vertical longitudinal sectional views of a left hand portion of the machine 25. While all of the separate components of the mechanism provided in the machine 25 for performing the stapling functions thereof cooperate in performing their respective parts of this function during each stapling cycle, there are some respects in which this total mechanism is divided into two stapling mechanisms, one at the left end of the machine and the other at the right end thereof, which operate independently of each other. In describing the total mechanism thereof this will be divided into left end stapling mechanism 138 and right end stapling mechanism 139. These stapling mechanisms are reverse duplicates of each other and therefore the full illustration of the left end stapling mechanism 138 will suffice for showing the structure and operation of both of these mechanisms. Where reference is necessary to the right end stapling mechanism 139, use will be made of reference numerals applied to corresponding parts of the left end stapling mechanism 138 with prime attached.

The left end stapling mechanism 138 includes lower and upper stapling heads 140 and 141 which are only shown in the operation views of FIGURES 11 and 12 so as to eliminate confusion in illustrating the structure of the machine disposed immediately adjacent to said stapling heads. Before proceeding with the description of the stapling mechanisms, it is to be noted that the machine 25 includes a super structure 150, comprising an inverted U-shaped shell which is united with and supported on the end housing decks 105. Secured at their lower ends to upper ends of channel standards 28 and 29 and at their upper extremities to the shell 150 are vertical guide shafts 151. Slidable on these shafts are cross heads 152 which are pivotally connected to the upper ends of pitmans 153, the lower ends of which are pivotally connected to the upper ends of crank arms 35. Suitable apertures 154 are provided in housing end decks 105 to accommodate the pitmans 153 when the crank shaft 34 is rotated. Each crosshead 152 has a bore which allows it to slide on the adjacent guide shaft 151 and also has, near its outer ends, guide bores 156 for allowing free passage therethrough of chain-actuating rods 157, the upper end portions of which are threaded to receive a pair of nuts 158, the lower nut of which has a flange 159. The lower ends of said rods are provided with collars 160.

When the parts of the machine 25 are in a position of rest as shown in the drawings (with the exception of the operation views) the cross heads 152 support an elevator platform 165 which includes end fittings 166 each of which is in the form of an angle having a horizontal plate 167 which is centrally apertured to slide on one of the guide shafts 151 and also has laterally spaced apertures 168 through which rods 157 and nuts 158 may freely extend vertically. The fittings 166 also include vertical plates 169 which are rigidly connected to opposite ends of the platform 165. The body of platform 165 which connects plates 169 comprises a pair of inwardly facing channels 170 (FIGURES 4 and 8) which are united at the middle of the platform by a box structure 171 forming an upper recess 172 centrally in said platform and providing mounts 173 for inner ends of pairs of conveyor rollers 174, the outer ends of which are mounted on the vertical plates 169.

Referring now to FIGURES 4, 7, 8 and 9, we find the left end stapling mechanism 138 to embrace lower and upper stapling head carriages 180 and 181 which are similar in construction but embody certain differences requiring them to be described separately. Lower stapling head carriage 180 includes a pair of horizontal slide shafts 182 which are secured at their opposite ends to left end standard channel 28 and to the frame channel beam 119 with these bars symmetrically disposed on opposite sides of the transverse vertical axial plane of the machine 25. Slidable on shafts 182 are two pairs of ball bearing slide blocks 183 and 184. A U-shaped stapling head carriage body 185 having a bottom 186 and side walls 187 is supported from said slide blocks by upper edges of the side walls being welded to said blocks. The space between pairs of blocks 183 and 184 is such as to allow another pair of slide blocks 188 to be mounted on slide shafts 182 between said first mentioned pairs of slide blocks and still leave about 3″ clearance for the sliding of blocks 188 on said shafts between said other pairs of blocks. Welded at its opposite lower ends to slide blocks 188 and extending upwardly therefrom is an inverted U-shaped member 189 which has secured to the upper end thereof by screws 190, a lug 191 which extends laterally from a carton contact bar 195. One of the slide blocks 188 has a lug 196 extending downwardly therefrom and opposite ends of a contractile spring 197 are secured to the lugs 196 and 196′ of the two stapling mechanisms 138 and 139 so as to constantly bias the slide blocks 188 and the carton contact bars 195 mounted thereon towards the middle of the machine. The bottom 186 of the carriage body 185 is apertured to receive vertically upwardly therethrough the indexing latch 59 which is located just inside the wall 187 located adjacent the lug 196 so that the upper end of said latch is opposed to said lug. A slide block 198 is fastened to the inner face of said side wall 187 to slidably receive said latch and cause it to participate in endwise movements of the carriage body 185 inasmuch as the collar 57 on which said latch is mounted slides freely on shaft 56.

Secured on and extending upwardly from each of the left pair of slide blocks 183 of the carriage body 185 is one of a pair of horizontally apertured lugs 199 which is provided for receiving one of a pair of roller chains 200 which are secured to collars 160 provided on the lower ends of chain actuating rods 157. After extending inwardly through the apertures in lugs 199, the chains 200 are provided with stop collars 201 which prevent these chains being pulled leftward through the lugs 199. Connected at their opposite ends to the lower ends of roller chains 200 and to the frame channel beam 119 are contractile springs 202 which pull the roller chains 200 inwardly through lugs 199 during each stapling operating cycle so as to free the left end stapling mechanism 138 to accommodate itself to the left end of a carton placed in the machine for stapling the same.

Rigidly mounted in vertical positons just within side walls 187 of the carriage body 185 of the lower stapling head carriage 180 is a pair of shift bars 203 which extend upwardly through the upper stapling head carriage 181 and are united thereabove by a spacer 204 and screws 205 extending through said shift bars into said spacer.

The lower ends of shift bars 203 are spaced inwardly from side walls 187 by spacer blocks 210 and are secured to said walls by bolts 211 (FIGURE 7).

Figure 8:
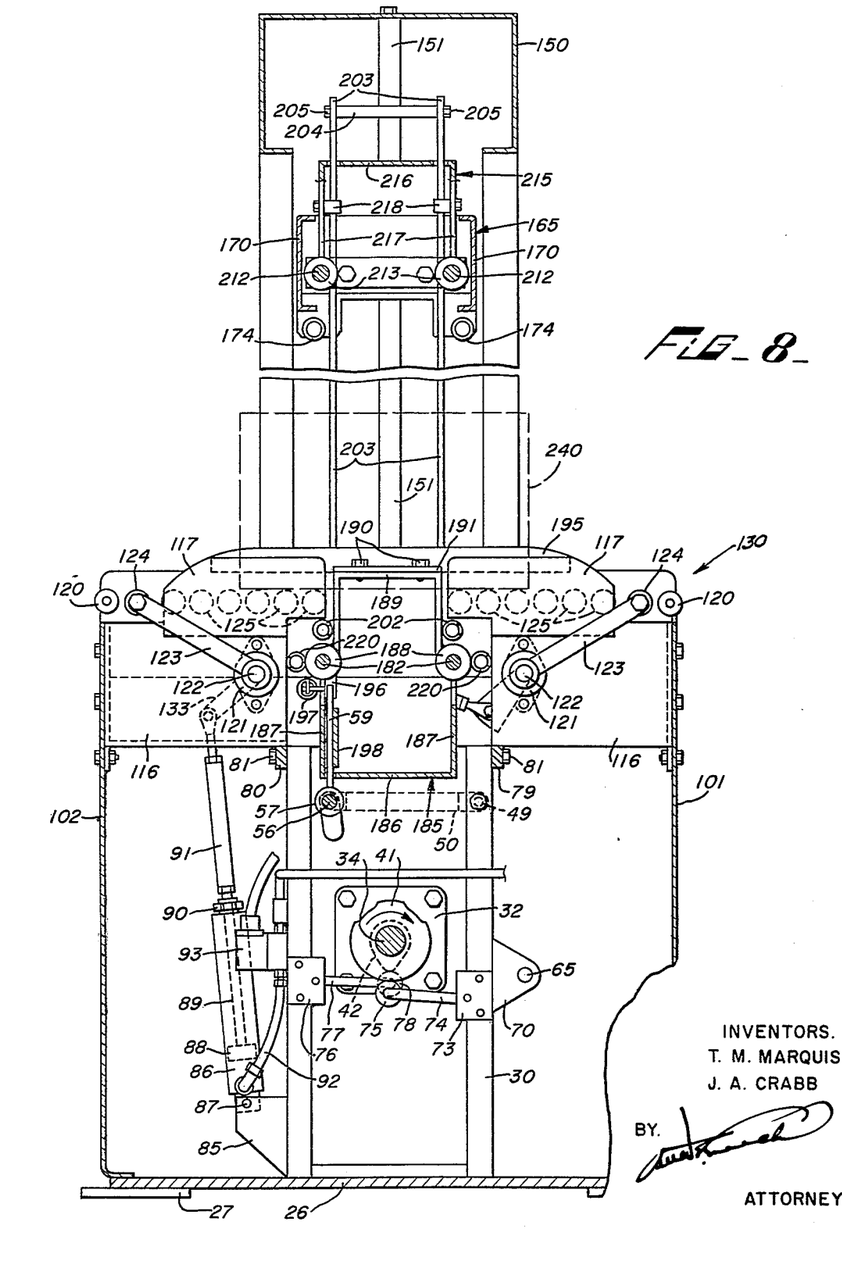
FIGURE 8 is a vertical sectional view taken on the line 8—8 of FIGURE 4 and shows particularly the stapling head carriages for the lower and upper stapling heads and the elevating platform on which said upper carriages are mounted.

The upper stapling head carriage 181 includes a pair of horizontal slide shafts 212 opposite ends of which are mounted upon the vertical plate 169 of end fitting 166 and on the central box structure 171 of the elevator platform 165. Slidable on the slide shafts 212 are two pairs of slide blocks, a left pair of blocks 213 and a right pair of blocks 214, said pairs of blocks being spaced apart the same distance on said shafts as the pairs of slide blocks 183 and 184 are spaced on slide shafts 182 and are disposed respectively directly above the last mentioned slide blocks. An inverted U-shaped upper carriage body 215 is provided which is a substantial duplicate of the lower carriage body 185 and it is supported on the pairs of blocks 213 and 214 by having its lower edges welded to said blocks as shown in FIGURES 4 and 8. The carriage body 215 has a top plate 216 and side walls 217. Bolted to inner faces of side walls 217 are a pair of shift bar guides 218 through which shift bars 203 extend vertically with free sliding movement. Suitable apertures are provided in top plate 216 through which shift bars 203 also extend freely.

Provided on each of the shift bars 203 and extending laterally therefrom approximately in the plane of the slide shafts 182 is a spring mounting lug 219 and a pair of powerful contractile springs 220 is provided, one end of each of said springs being connected to one of the lugs 219 and the opposite ends of said springs being connected to the inverted channel beam 119 (FIGURE 4).

As shown in operation FIGURES 11 and 12, lower stapling head 140 is mounted in lower carriage body 185 and secured thereto by bolts 225 and upper stapling head 141 is mounted in upper carriage body 215 and secured thereto by bolts 226.

The right end stapling mechanism 139, which is only fragmentarily disclosed in the drawing, is a right hand duplicate of the left end stapling mechanism 138, the description of which has just been concluded. Right end stapling mechanism 139 provides a mounting means for a lower stapling head 140′ and for an upper stapling head 141′ in identically the same manner as the mounting provided by left end stapling mechanism 138 for lower and upper stapling heads 140 and 141. Located respectively at opposite ends of the machine 25, these stapling mechanisms shift independently of each other relative to the center line 118 during each stapling cycle of the machine.

Figure 13:
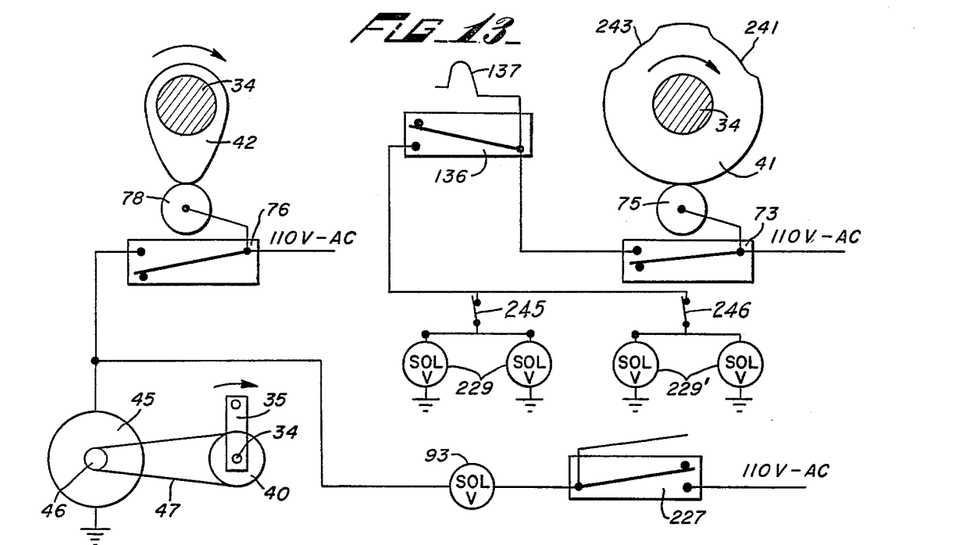
FIGURE 13 is a wiring diagram of the invention.
Figure 14:
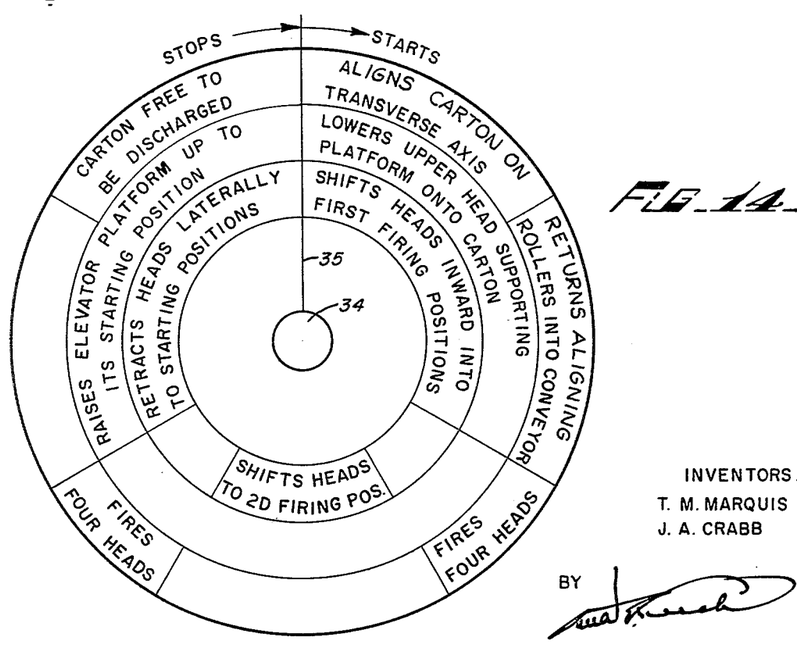
FIGURE 14 is a diagrammatic analysis of a complete cycle of operation of the machine of the invention which is co-extensive with a single revolution of the cam shaft of the invention.

Referring now to the wiring diagram of FIGURE 13, it is noted that the operation of the stapling machine 25 is facilitated by the provision of a foot switch 227, the actuation of which energizes the electric motor 45 and initiates a single revolution of the crank shaft 34 during which a complete stapling cycle is performed by the machine 25. Depression of the foot switch 227 need only be momentary to cause the completion of such a cycle because when the cam shaft 34 has rotated about 30°, the cam 42 closes the normally open cycle-closing switch 76 and continues to energize the drive motor 45 until at the completion of a single rotation of the shaft 34 the cam 42 again opens switch 76, thus de-energizing motor 45 and automatically setting a brake 228 with which this motor is equipped, thus halting rotation of the motor and the cam shaft 34 just as a single revolution of the latter is completed.

Figure 10:
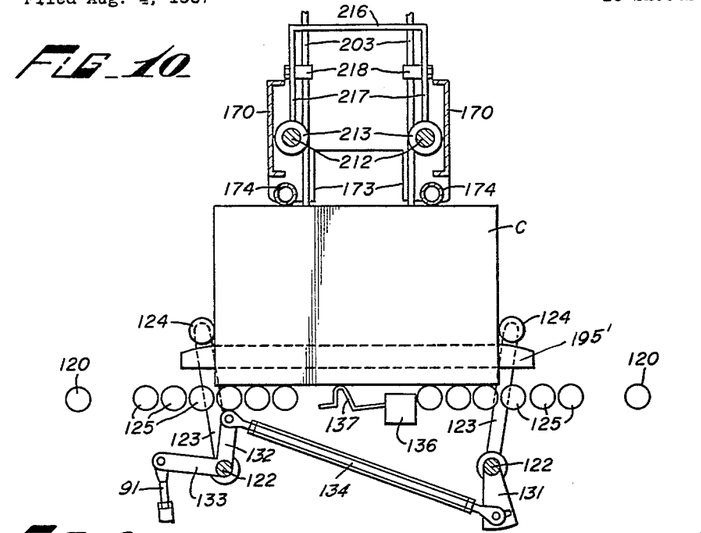
FIGURE 10 is a diagrammatic operational view taken in the same plane as FIGURE 9 and illustrates the action, at the start of a stapling cycle, of the mechanism for aligning the carton transversely with the stapling mechanisms of the machine.

The firing of the lower stapling heads 140 and 140′ during a revolution of the cam shaft 34, as above indicated, is accomplished by electrically energizing solenoid controlled air valves 229 and the firing of upper heads 141 and 141′ is accomplished by energizing similar valves 229′. This can be done only when a carton C has been introduced into the machine 25 onto the carton conveyor 130 so as to depress the actuating finger 137 of safety switch 136, as shown in FIGURES 10, 11 and 12.

OPERATION

The carton C selected for illustration in the operation views is only one of many different sizes of cartons varying in height, width and length which the machine 25 is adapted to handle without any adjustment whatsoever. These cartons are of the type in general use commercially and are made of fiberboard with side walls and flaps, the latter including bottom end flaps 230 and bottom side flaps 231 and top end flaps 232 and top side flaps 233. The machine 25 receives the carton C of any of the range of sizes within the capacity of the machine to handle and in a single stapling cycle drive two pairs of staples 234 in the top and bottom of the carton located approximately ¾″ inwardly from the ends of the carton and then drives two pairs of staples 235 in the top and bottom of the box which are located respectively inwardly from the staples 234 by a distance of approximately 3″. Two staples are thus driven downwardly through the upper side flaps into each of the upper end flaps and two staples are driven upwardly through each of the bottom side flaps and into each of the bottom end flaps.

To operate the machine 25 a carton C first has the bottom side flaps folded over the bottom end flaps after which the carton is filled with a product such as apples or oranges. The top end flaps are then folded down and the top side flaps folded over the end flaps and the carton is then introduced broadside onto the carton conveyor 130 into a random position within the machine 25 in an approximately centered relation with the machine. Coincidental with the introduction of the carton C into the machine 25, the foot pedal switch 227 is closed by pressure from the foot of the operator which energizes the electric motor 45 of the machine and starts cam shaft 34 to rotate. As aforestated, a 30° rotation of the shaft closes cycle-closing switch 76 and permits the operator to withdraw his foot from the switch 227 and attend to readying another carton for introduction into the machine 25 at the conclusion of the stapling cycle just started.

The depression of switch 227 to initiate a stapling cycle in the machine 25 also energizes the solenoid valve 93 causing compressed air to be delivered to the air cylinder 86 which rotates the shafts 122 in opposite directions to swing the carton centering rollers 124 upwardly against opposite sides of the carton C so as to centralize the carton in transverse alignment with the vertical axial plane of the left and right stapling mechanisms 138 and 139.

So rapid is the action of air cylinder 86 in thus transversely aligning the carton with the machine 25, that the momentary depression of foot switch 227 to initiate a stapling cycle in said machine is adequate to cause this carton centralizing function to be performed in the fraction of a second during which the operator's foot remains resting on this foot pedal switch. The carton C is thus aligned transversely with the transverse medial vertical plane of the machine 25 before any of the elements of the right and left stapling mechanisms come into contact with the carton. The carton however is not centralized in the machine relative to a fore and aft axis of the latter but is still located eccentrically relative to the center line 118 of the machine. This relationship of the carton C with the left and right stapling mechanisms when a stapling cycle is initiated in the machine 25 is clearly shown in the broken line 240 in FIGURES 4, 6 and 8 which indicates the outline of said carton in the machine.

When the carton C is introduced into the machine 25 it deflects and closes safety switch 136 so as to activate the circuits of the solenoid air valves 229 and 229′ of the respective pairs of lower and upper stapling heads so that when the cam 41 turns so that its initial dwell 241 comes opposite the switch roller 75, the solenoid air valves 229 and 229′ will be actuated to energize all of the stapling heads which will simultaneously drive staples from said heads. When this takes place, these heads will be located as shown in FIGURE 11 by virtue of the fact that the descent of the crossheads 152 upon the rotation of cam shaft 34, allows the chain actuating rods 157 to be drawn downwardly by the contractile springs 202 pulling on roller chains 200 so as to relieve the left and right stapling mechanisms from the restraint imposed on these by said chains 200 and permit these mechanisms to be shifted by springs 220 towards the carton C until the bars 195 and 195′ of these respective stapling mechanisms contact opposite ends of the carton so that these bars cannot move any further inwardly relative to the carton but are held pressed against the carton ends as shown in FIGURE 11 by contractile springs 220. The constrictive action of springs 220 continue to shift the lower and upper carriage bodies 185 and 215 inwardly toward the center line 118 of the machine 25 until the latches 59 and 59′ of the left and right stapling mechanisms are brought into contact with the lugs 196 and 196′ respectively of said mechanisms so as to halt the latter in the positions in which these are shown in FIGURE 11. This adjustment of the right and left stapling mechanisms in operative relation with end portions of the carton C with the latter in its random transverse position as shown in FIGURE 11 takes place prior to roller 75 riding into dwell 241 of cam 41 so as to fire the four stapling heads of the machine, thereby causing these to drive staples into the top and bottom of the carton C in alignment with indicating lines 242 which are placed on these stapling heads in the operation views to indicate the lines on which staples are driven from said heads.

When the cam shaft 34 has rotated approximately 180° the stapling head relocation trigger cam 43 comes into operation so as the pull downwardly on shaft 56 thereby withdrawing latches 59 and 59' from engagement with lugs 196 and 196' thus freeing the stapling head carriages in both left and right stapling mechanisms from restraint by said latches and permitting the springs 220 to act on these carriages to shift the same from the positions in which they are shown in FIGURE 11 to the positions in which they are shown in FIGURE 12 in which the stapling heads are located 3" closer to the center of the carton than they were when they drove the first pairs of the staples on the top and bottom of the carton. Thus when the cam shaft 34 is rotated so as to bring the second dwell 243 of cam 41 into engagement with the switch roller 75, the stapling heads are repositioned as shown in FIGURE 12 and they are thus caused to drive a second pair of staples, both in the top and in the bottom of the carton C, these staples being located 3" inwardly respectively from the first pairs of staples driven into the carton when the stapling heads were positioned as shown in FIGURE 11.

As the rotation of the cam shaft 34 approaches its starting position which concludes the stapling cycle of the machine 25, the crossheads 152 are lifted back to their beginning positions as shown in FIGURE 4 in which these crossheads come into contact with pads 244 provided on the end fittings 166 of the elevator platform 165 so as to lift this platform back into its original elevation as shown in FIGURE 4 thus relieving the carton of the weight of the elevator and freeing the carton for discharge from hte machine. The return upward of the crossheads 152 also brings these into contact with nuts 158 and 158' so as to lift the chain actuating rods 157 and 157' back to their uppermost positions which pulls the roller chains 200 and 200' outwardly through the apertured lugs 199 and 199' and pulls the left end stapling mechanism 138 and the right end stapling mechanism 139 back respectively to the left and right ends of the machine 25.

The carton C is thus left fully stapled resting on the carton conveyor 130 and ready to be pushed therefrom onto a suitable conveyor line provided to receive the same which is usually accomplished in replacing the carton just stapled with another carton being delivered to the machine to be stapled.

While the machine 25 is primarily designed for the simultaneous driving of like pairs of staples upwardly and downwardly into the bottom and top of a carton C, it is adaptable to be optionally employed to merely drive staples upwardly into the bottom of a carton or to merely drive staples downwardly into the top of a carton.

In the first of these two optional uses, the machine 25 would unite the bottom flaps of an empty carton to prepare the same for receiving a product to be packaged therein. In this use the carton would be discharged from the machine with the top flaps free to be opened for filling the carton.

In the second aforesaid optional use of the machine 25, the cartons fed thereto have previously had their bottom flaps stapled together (possibly on the same machine), then filled with a product and the top flaps folded in overlapping relation thereover. In this use, the machine merely drives staples downwardly into the carton to secure the top flaps together and discharges the completed package from the machine.

To provide the operator with these two optional uses of the machine 25, electricity from the system illustrated in FIGURE 13 is transmitted to solenoid controlled valves 229 through a manually operable, normally closed switch 245, while said system connects with valves 229' through a like switch 246. The only thing required to render the lower stapling heads 140 and 140' inoperative while the rest of the machine functions during an operational cycle as above described is to open switch 245. When this switch is closed and switch 246 is opened, upper stapling heads 141 and 141' are inoperative while lower heads 140 and 140' function normally, as described, during each operational cycle.

We claim:
1. In a carton stapling machine for stapling together overlapping flaps of a cardboard carton, the combination of:
   means for supporting such a carton introduced broadside at random into said machine on its bottom;
   a left stapling mechanism for driving staples vertically into said carton a predetermined distance inwardly from the left end thereof;
   a right stapling mechanism for driving staples vertically into said carton the same predetermined distance inwardly from the right end of said carton;
   means for mounting said stapling mechanisms for transverse movement in said machine so that said staples are always driven in a transverse vertical axial plane of said machine;
   means for retracting said left and right stapling mechanisms laterally at the conclusion of a stapling cycle;
   means for aligning said carton with said transverse plane at the start of a stapling cycle;
   means for yieldably shifting said stapling mechanisms independently inwardly into contact with said carton at the beginning of a stapling cycle and thus position said mechanisms independently from each other for driving staples vertically into said carton with said staples spaced proper predetermined distances from the respective ends of said carton;
   means for actuating said stapling mechanisms to drive staples vertically into said carton when said mechanisms are so positioned; and
   means for coordinately causing the aforesaid means to perform their respective functions to accomplish a complete stapling cycle in said machine.
2. A stapling machine as recited in claim 1, wherein:
   each of said left and right stapling mechanisms includes a lower stapling head and an upper stapling head;
   means maintaining the lower and upper stapling heads of said mechanisms in respective vertical alignment with each other while said mechanisms are being shifted horizontally during a stapling cycle of said machine; and
   means for supporting said upper stapling heads upwardly out of contact with said carton prior to the starting of a stapling cycle and lowering said upper stapling heads into operative juxtaposition relative to said carton during a stapling cycle whereby staples are driven downwardly vertically from said upper stapling heads and upwardly vertically from said lower stapling heads and into said carton during the actuation of said stapling heads during said stapling cycle.
3. A stapling machine as recited in claim 1 wherein:
   means is provided for shifting each of said left and right stapling mechanisms a second predetermined distance inwardly relative to said carton from the positions held by said mechanisms when driving the first pair of staples recited above; and
   means causing said stapling mechanisms to be actuated a second time during each stapling cycle while said stapling mechanisms are indexed inwardly from their first staple driving positions aforesaid so as to drive a second pair of staples vertically into said carton which are spaced inwardly from the first pair of staples so driven by said second predetermined distances aforesaid.

4. A stapling machine as recited in claim 1, wherein: each of said left and right stapling mechanisms includes a lower stapling head and an upper stapling head;

means maintaining the lower and upper stapling heads of said mechanisms in respective vertical alignment with each other while said mechanisms are being shifted horizontally during a stapling cycle of said machine;

means for supporting said upper stapling heads upwardly out of contact with said carton prior to the starting of a stapling cycle and lowering said upper stapling heads into operative juxtaposition relative to said carton during a stapling cycle whereby staples are driven downwardly vertically from said upper stapling heads and upward vertically from said lower stapling heads and into said carton during the actuation of said stapling heads during said stapling cycle;

means for shifting each of said left and right stapling mechanisms a second predetermined distance inwardly relative to said carton from the positions held by said mechanisms when driving staples therefrom in the first actuation thereof in said cycle; and means causing said stapling mechanisms to be actuated a second time during each stapling cycle while said stapling mechanisms are indexed inwardly from their first staple driving positions aforesaid, each mechanism thus driving a pair of spaced staples upwardly and another pair of spaced staples downwardly into said carton during each stapling cycle.

5. A stapling machine as recited in claim 2, wherein means is provided for optionally disconnecting said lower stapling heads on the one hand or said upper stapling heads, on the other hand, from the means for actuating said heads, whereby the upper heads alone or the lower heads alone, as the case may be, will be actuated during each operational cycle of said machine.

6. In a carton stapling machine for stapling together overlapping flaps of a carton, the combination of:

a frame;

a conveyor provided on said frame for receiving a carton delivered to said machine, supporting the same during a stapling operation, and discharging said carton from said machine;

a cam shaft rotatably mounted on said frame below said conveyor, opposite ends of said shaft being equipped with crank arms;

a pair of vertical slide shafts mounted on said frame at opposite ends thereof and extending upwardly;

a pair of crossheads slidable on said slide shafts;

a pair of pitmen pivotally connected at their opposite ends to said crank arms and said crossheads;

power means for causing said cam shaft to rotate in independent cycles of a single revolution, each starting and ending with said crank arms in up position;

a relatively light elevator platform opposite ends of which rest on said crossheads and which overlies said conveyor in symmetrical relation with the vertical transverse plane containing the axes of said slide shafts;

a stapling head carriage transversely slidably mounted on said elevator platform;

a stapling head mounted on said carriage, said head being adapted for actuation by compressed air whereby the actuation of said head to drive a staple downwardly therefrom applies no downward pressure to said head;

means for yieldably shifting said carriage transversely inwardly on said platform when said platform is lowered to rest on a carton positioned on said conveyor during a rotational cycle of said cam shaft to properly relate said stapling head for driving a staple therefrom in the top of said carton at a location a predetermined distance inwardly from an end thereof and then returning said stapling head to its starting position relative to said platform, at the conclusion of said stapling cycle; and means for actuating said stapling head coinciding with its being propertly related with said carton, as aforesaid, to cause said head to drive a staple downwardly into said carton at a point located said predetermined distance inwardly from the end of said carton.

7. A carton stapling machine as recited in claim 6 including:

a lower stapling head provided in said machine for driving a staple in the bottom of said carton;

a slide carriage provided on said frame beneath said conveyor for mounting said lower stapling head for horizontal sliding movement just beneath said carton, the aforesaid means for horizontally shifting said upper stapling head carriage and actuating said upper stapling head also functioning to shift said lower stapling head into proper relation with said carton during a stapling cycle of said machine for driving a staple upwardly into said carton located aforesaid predetermined distance inwardly from the end thereof, and actuating said lower stapling head to drive a staple upwardly into said carton at said location concurrently with the actuation of said upper stapling head to drive a staple downwardly into said carton during said cycle, said carriage shifting means maintaining said upper stapling head carriage and said lower stapling head carriage in vertically superimposed relation and returning both of said carriages to their starting positions at the end of each stapling cycle.

8. A carton stapling machine as recited in claim 7 including:

spring means which constantly bias said upper and lower stapling head carriages towards the center of said machine and deliver said stapling heads into operative relation with said carton, as aforesaid; and means actuated by the return upward of said crossheads to shift said stapling head carriages to their starting positions adjacent one end of said machine thereby retensioning said spring means.

9. A carton stapling machine as recited in claim 8 wherein:

said machine is provided with a left end stapling mechanism and a right end stapling mechanism and each of said mechanisms embraces an upper stapling head, a lower stapling head, an upper stapling head carriage, a lower stapling head carriage and means for actuating said elements during each stapling cycle of the machine to coordinately relate said stapling heads to said carton and drive staples from said heads into said carton from the top and bottom thereof at a predetermined distance from one end of said carton so that during each stapling cycle and with each actuation of said stapling heads a pair of staples is driven downwardly into the top of said carton and another pair of staples is driven upwardly into the bottom of said carton.

10. A carton stapling machine as recited in claim 9 wherein:

means is provided following the actuation of said stapling heads in each given cycle in which two pairs of staples are driven downwardly and upwardly into said carton at predetermined distances inwardly from opposite ends thereof, to cause said carriages to be shifted a second predetermined distance further inwardly relative to said carton and then cause said stapling heads to be again actuated to drive a second two pairs of staples downwardly and upwardly into said carton during said same stapling cycle of said machine.

References Cited

UNITED STATES PATENTS

| | | | |
|---|---|---|---|
| 1,949,108 | 2/1934 | Paxton | 227—100 XR |
| 2,723,393 | 11/1955 | Verrinder et al. | 227—100 XR |
| 2,984,837 | 5/1961 | Paxton et al. | 227—153 XR |
| 3,126,685 | 3/1964 | Paxton et al. | |
| 3,181,730 | 5/1965 | Schafroth | 227—99 XR |

GRANVILLE Y. CUSTER, Jr., Primary Examiner

U.S. Cl. X.R.

53—138; 227—153